United States Patent [19]

Wessel

[11] 4,391,479
[45] Jul. 5, 1983

[54] MINIATURE MATRIX PROGRAMMING BOARD

[75] Inventor: Kenneth R. Wessel, White Plains, N.Y.

[73] Assignee: Sealectro Corporation, Mamaroneck, N.Y.

[21] Appl. No.: 252,429

[22] Filed: Apr. 9, 1981

[51] Int. Cl.³ .......................................... H01R 29/00
[52] U.S. Cl. ................................. 339/18 C; 403/292
[58] Field of Search .............. 339/17 C, 17 LC, 18 R, 339/18 B, 18 C, 18 P, 198 H; 403/292, 294, 297, 298; 52/586

[56] References Cited

U.S. PATENT DOCUMENTS 3,603,053 9/1971 Van Loghem ..................... 403/292
4,084,870 4/1978 Laserson et al. .................. 339/18 P
4,126,006 11/1978 Lewis ................................. 403/298

FOREIGN PATENT DOCUMENTS 1946486 9/1971 Fed. Rep. of Germany ...... 403/292
866081 4/1961 United Kingdom .............. 339/18 C Primary Examiner—Neil Abrams
Attorney, Agent, or Firm—Hedman, Casella, Gibson, Costigan & Hoare

[57] ABSTRACT

A matrix programming board is disclosed for selectively connecting pairs of conductive bars. The programming board includes two sets of parallel conductive bars disposed in orthogonal relationship. Each conductive bar includes cylindrical sockets held in position within an insulator block formed with a hole for each socket. Connecting pins, applied through a perforated cover plate, join a conductive bar in one set with a similar bar in the other set. L-shaped termination pins are provided to facilitate mounting of the programming board to a printed circuit board. The board includes a locking recess for engagement with a longitudinal rail to enable adjacent programming boards to be mounted in aligned abutting relationship. In a preferred embodiment, the connecting pins are provided with a detent for maintaining a secure electrical interengagement with the sockets of the conductive bars.

15 Claims, 5 Drawing Figures

MINIATURE MATRIX PROGRAMMING BOARD

BACKGROUND OF THE INVENTION

The subject invention relates to a matrix programming board which can be utilized to establish connections between conductors. The subject matrix board is particularly suited to applications wherein the connections must be frequently changed.

In the communications industry, programmable matrix boards have been used to establish connections used in telephone circuits. Since phone installations are frequently changed, it is necessary to provide circuitry which can be readily reprogrammed in accordance with the changes. Accordingly, matrix boards or cross bar switches have been utilized. In a conventional matrix board, an insulated housing is provided having a series of parallel cross bars mounted therein. Each cross bar includes a plurality of pin receiving apertures. A second series of parallel cross bars are disposed at right angles to the first series and are electrically isolated therefrom. The housing includes a pair of opposed cover plates, at least one of which is provided with a plurality of apertures aligned with the apertures in the array. Any one of the cross bars in one series can be joined to any one of the cross bars in the other series by inserting a connecting pin in the proper aperture to establish electrical contact with the associated cross bars. Changing the connections is achieved merely by relocating a connecting pin. The above described programmable matrix board is being utilized in increasingly complex assemblies. Accordingly, it would be desirable to provide a matrix board having improved versatile connection capabilities.

Accordingly, it is an object of the subject invention to provide a new and improved matrix programming board to facilitate connections between contact arrays.

It is another object of the subject invention to provide a new and improved matrix programming board which is connectable to printed circuit boards in varied orientations.

It is a further object of the subject invention to provide a new and improved matrix programming board having an improved locking means providing ready interengagement between adjacent and abutting matrix boards.

It is still another object of the subject invention to provide a matrix programming board wherein the pins are provided with a locking feature for maintaining the electrical connection with the sockets of a connective bar.

SUMMARY OF THE INVENTION

In accordance with these and many other objects, the subject invention comprises a matrix connector assembly including an insulator block formed with a plurality of open ended cylindrical apertures, disposed in spaced relationship and terminating in opposed planar surfaces. A plurality of conductive bars are provided, each including interconnected cylindrical sockets. One series of conductive bars are positioned on the top surface of the insulator block in a parallel array. Each of the cylindrical sockets of the conductive bars is received in one end of the apertures formed in the block. A second series of conductive bars is mounted on the bottom surface of the insulator block in a parallel array, orthogonal to the upper array. Similar to the upper array, the cylindrical sockets of the conductive bars are received in the other ends of the apertures formed in the insulated block. The dimensions of the insulator block and the sockets are arranged such that the upper and lower conductive bars are spaced apart and not in electrical contact.

A pair of cover plates are secured to the top and bottom of the insulator block. Each cover plate includes a plurality of apertures in alignment with the apertures in the insulator block to allow for the insertion of connecting pins. Preferably, the inner surface of the cover plates include ribs to aid in the alignment of the conductive bars. In use, a connecting pin is inserted through the cover plate into the aligned aperture of the insulator block and is received in the pair of sockets within the aperture. Accordingly, contact is established between the top and bottom conductive bars. The connecting pins may be provided with a detent which cooperates with the sockets to maintain the electrical interconnection.

The sockets of the conductive bars are designed to achieve constant engagement with the contact pins. Each socket is in the shape of a cylindrical tube with an axial slit therealong. When the connecting pin is inserted, the tube expands slightly, exerting pressure on the pin by virtue of the elastic behavior of the contact forming material. This pressure is a function of the individual contact only and is not effected by the action of adjacent contacts. Preferably, each socket includes three inwardly projecting dimples spaced circumferentially therearound at equal intervals. The inwardly projecting dimples create a redundant electrical contact with the connecting pin to provide greater contact reliability. The apertures in the insulator block are configured with a diameter slightly greater than the diameter of sockets to create a loose fit relationship therebetween. By this arrangement, upon the insertion of the connecting pins the flexibility provided by the loose fit arrangement permits the self-aligning of the contacts within the holes.

The lower cover plate is further provided with termination holes disposed adjacent the side edges thereof. The termination holes are aligned with the peripheral apertures in the insulation block which have only one socket therein. Accordingly, the insertion of a termination pin within a termination hole establishes electrical contact with only a single conductive bar. The termination pins are in turn connectable to the desired circuitry, frequently formed on a printed circuit board. In certain applications, the matrix board is connected to a printed circuit board which is disposed parallel to the bottom cover plate. In this configuration, buttons or standoffs projecting downwardly from the bottom cover plate are provided and function to space the printed circuit board away from the cover plate. The spacing between the cover plate and the printed circuit board is required to prevent solvents, used in soldering the pins to the circuit board, from being drawn up into the matrix board by capillary action. The spacing inhibits any wicking action which could short the connectors.

As circuitry has become more complex, assemblies have been designed where it would be desirable to connect more than one circuit board to the matrix connector. Not only would a circuit board be disposed parallel to the bottom cover, but in addition, a second circuit board would be disposed parallel and adjacent the side wall of the insulator block. Mounting a circuit board parallel to the side wall of the insulator block facilitates soldering of the connecting pins and permits programming from the front of the board. The subject matrix connector permits this type of dual connection. More specifically, a plurality of L-shaped termination pins are provided having first and second legs disposed in perpendicular relationship. In use, one leg of the L-shaped pin is receivable in the termination holes provided in the lower cover plate, while the second leg projects outwardly beyond the plane of the side wall of the insulator block. Connection can then be made to a circuit board disposed parallel to the side wall structure. In order to permit the simultaneous connection between the matrix board and both printed circuit boards, the L-shaped termination pins are set in grooves defined in the bottom cover plate such that they lie substantially flush with the lower planar surface thereof. By this arrangement, the L-shaped pins which rest in the grooves will be spaced from the lower printed circuit board (disposed parallel to the bottom cover plate) an amount sufficient to prevent shorting. Preferably, the diameter of the apertures in the matrix connector are slightly larger than the termination pins such that the matrix board can be easily withdrawn from the printed circuit boards leaving the termination pins connected to the latter. By this arrangement, another preprogrammed matrix board may be remounted onto the connecting pins thereby minimizing down time.

Due to the advantages of miniaturized circuit arrangements it is desirable to mount a plurality of matrix programming boards in side by side relationship. Accordingly, the subject invention includes an improved means for rapidly and securely mounting the matrix boards in abutting relationship. The means includes providing a pair of longitudinally extending rectangular locking recesses in the opposed side walls of the insulator block. A dovetail slot is provided in the rear surface of the recess. A longitudinally extending support rail is provided including a pair of complimentary dovetail tangs. Each dovetail tang is resilient and includes a central slit enabling the tang to be popped or snap fit within the complimentary dovetail recesses formed in the insulator blocks. The cooperation between the rails and the locking recesses permits rapid mounting of adjacent matrix programming boards.

Further objects and advantages of the subject invention will become apparent from the following detailed description taken in conjunction with the drawings in which:

DESCRIPTION OF THE PREFERRED EMBODIMENT

Figure 1:
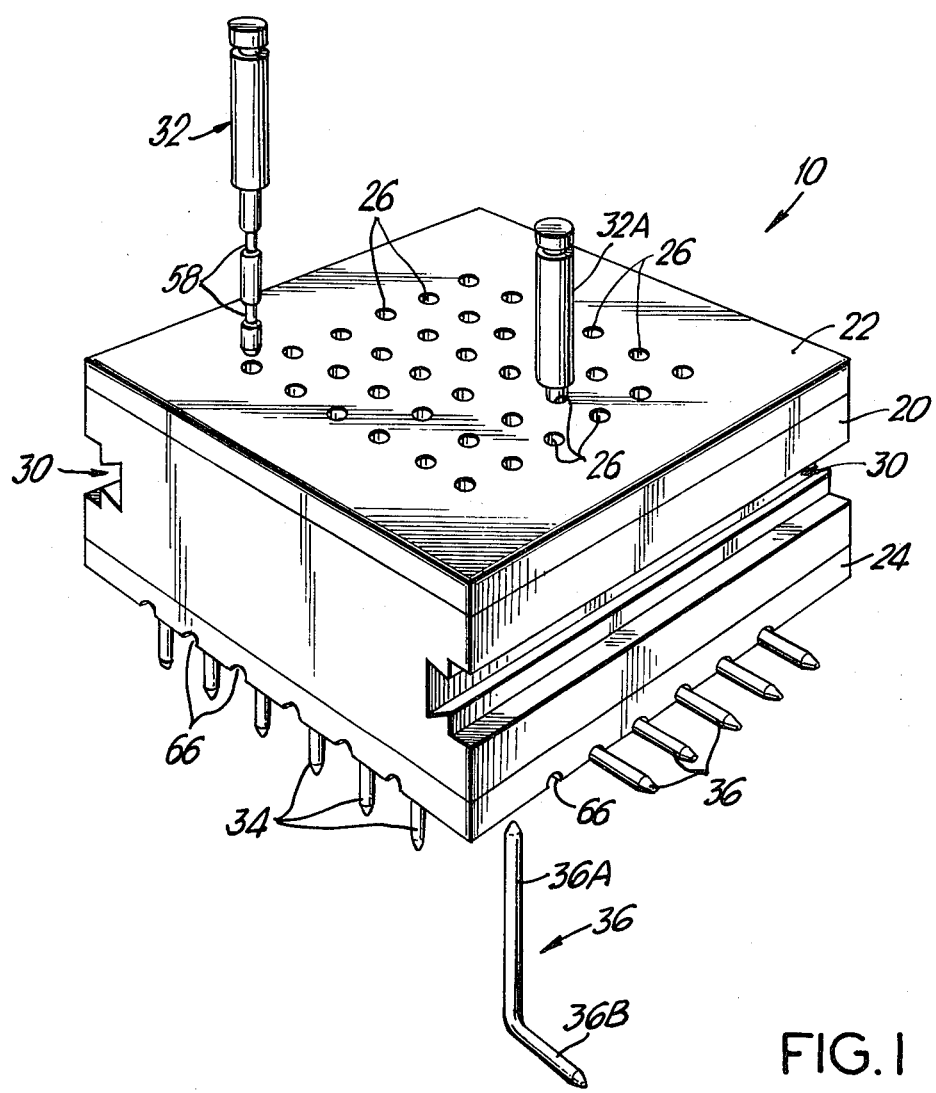
FIG. 1 is a perspective view of the new and improved programmable matrix board of the subject invention, including connecting pins.
Figure 2:
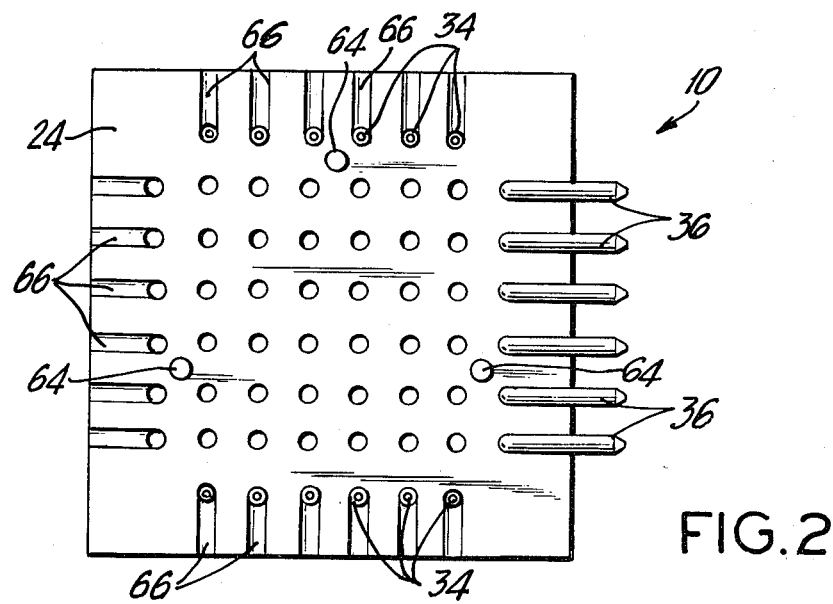
FIG. 2 is a bottom plan view illustrating the bottom cover plate of the programmable matrix board of the subject invention.
Figure 3:
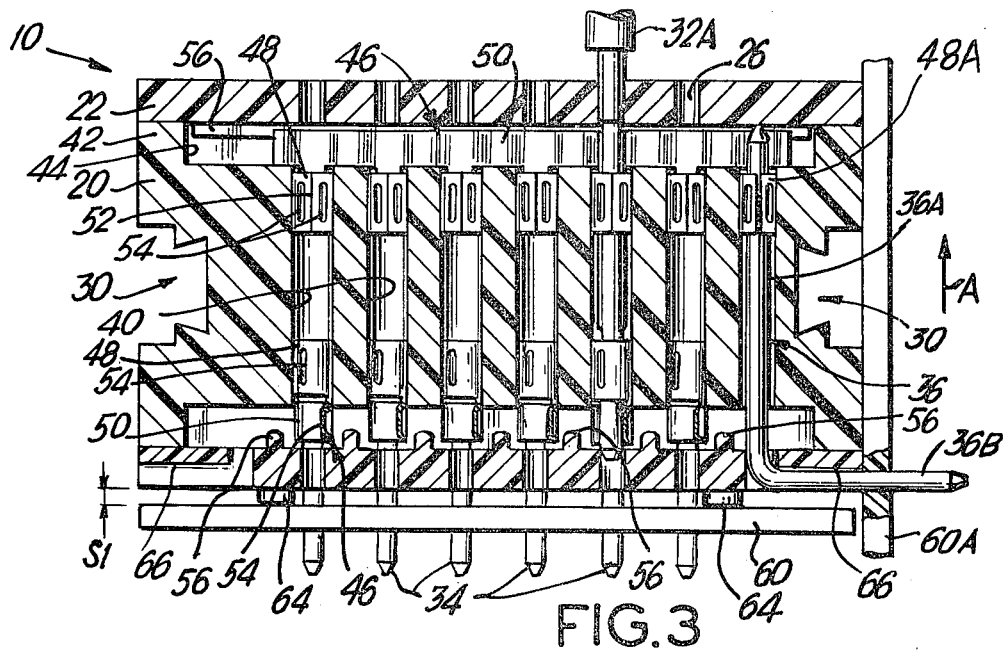
FIG. 3 is a cross-sectional view, taken along the lines 3—3 in FIG. 1, of the programmable matrix board of the subject invention illustrating a dual mounting with a pair of printed circuit boards.

Referring to FIGS. 1 through 3, there is illustrated the programmable matrix board 10 of the subject invention. The connector board 10 includes a generally rectangular insulator block 20 sandwiched between opposed top and bottom cover plates 22 and 24, respectively. The cover plates include a plurality of apertures 26 disposed in aligned parallel arrays. The opposed side walls of the insulator block include a locking configuration 30 to facilitate the joining and mounting of adjacent connectors 10, as more fully described hereinbelow.

A variety of connecting pins are utilized with the subject invention. More specifically, and as illustrated in FIG. 1, straight connecting pins 32 are provided for insertion into the holes 26 of the top cover plate 22 for programming the connector 10. Termination pins 34 and 36 are shown inserted in the bottom cover plate 24 and are provided to interconnect the matrix board to the circuit. The termination pins 34 and 36 are mounted adjacent the side edges of the subject connector and are in electrical contact with only one conductive bar.

Figure 4:
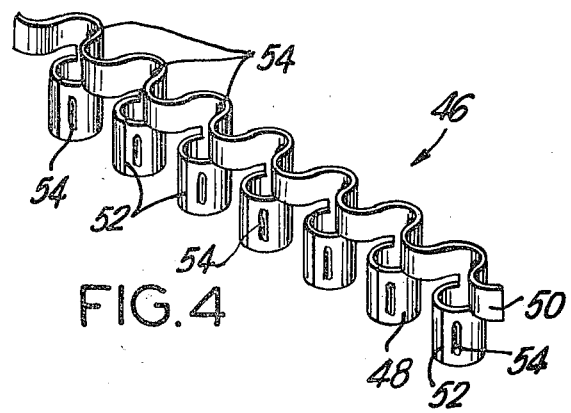
FIG. 4 is a perspective view of a conductive bar of the programmable matrix board of the subject invention.

Referring to FIG. 3, insulator block 20 includes a plurality of apertures 40 which extend through the block and are open at either end. The upper and lower surface of block 20 include a circumferential flange 42 defining a recess 44 for containing the conductive cross bars 46. The conductive cross bars 46 are preferably formed from a single sheet of metal, preferably a suitable copper alloy such as CDA 725 or beryllium copper. As illustrated in FIG. 4, each cross bar 46 includes a plurality of interconnected sockets 48 formed integrally with a longitudinally extending bar portion 50. The bar portion 50 is corrugated having alternating ridges and grooves to add flexibility, facilitating the alignment and insertion of sockets in the block 20. Each socket portion 48 is generally cylindrical in configuration having a diameter less than the diameter of the apertures 40 provided in the insulator block 20 such that a loose fit arrangement is defined permitting the sockets to float within the apertures 40. The ability of the sockets to move within the apertures acts as a self-alignment means during the insertion of the connecting pins.

Each socket 48 is split longitudinally at 52 to insure a secure electrical interconnection. More specifically, during the insertion of a connecting pin, the split enables the socket to expand, while the spring memory of the metal functions to securely engage with the pin to insure good electrical contact. Preferably, the inner surface of each socket is provided with inwardly extending dimples 54 to provide a redundant electrical interconnection between the connecting pin and the socket.

The conductive bars 46 are mounted in the apertures of the insulator block in parallel arrays. More specifically, a series of conductive bars 46 are mounted in a parallel array adjacent the top surface of the insulator block while a second series is mounted on the bottom surface thereof in a parallel array, orthogonal to the upper array. As illustrated in FIG. 3, the sockets of each conductive bar are receivable in the upper ends of the openings 40 with the bar portion projecting upwardly and fitting within the recess 44. Similarly, the lower series of conductive bars are mounted in the insulator with the sockets 48 being received in the lower open ends of the apertures 40. As seen in FIG. 3, there is discrete spacing between the opposed sockets in each aperture such that they are not in electrical contact. One socket of each array, which is located adjacent the periphery of the insulator block, represents the termination of the conductive bar. This socket 48A is the only socket in the aperture 40 facilitating the connection of the bar with an outside circuit via termination pins.

After the conductive bars 46 have been inserted within the insulator block 20, the cover plates are mounted thereon and fixedly connected thereto, preferably by adhesives. The inner surface of each cover plate is provided with integral ribs 56 to aid in aligning the conductive bars.

The subject matrix board 10 is programmed by inserting pins 32 into apertures 26 on the top cover plate. The corresponding aligned apertures provided in the bottom cover plate may also be utilized for this purpose. In the illustrated embodiment, the conductive bars of the upper layer extend in a parallel array perpendicular to the sides of the insulator which include the locking recess 30. In contrast, the lower array of conductive bars extends in an array perpendicular to the upper array. In accordance with the subject invention, the insertion of pin 32 functions to connect a conductive bar in both the top and bottom arrays. For example, pin 32A, illustrated in FIG. 1, connects the fourth conductive bar in the upper array to the second conductive bar in the lower array. A plurality of similar connections can be made by inserting additional pins. A connection can be readily changed by removing a pin and replacing it in a different hole.

As illustrated in FIG. 1, connecting pins 32 may be provided with detents 58 disposed to be aligned with the dimples 54 of the sockets 48 when the pin is inserted within the insulator block 20. The dimples 54 cooperate with the detents 58 to maintain the electrical interconnection. This arrangement is preferred when high vibrations are to be encountered which could loosen and eject the pins. The opposed edges of each detent 58 may be sharply angled as illustrated in FIG. 1 or may be smoothly radiused to facilitate insertion.

In many applications, the subject matrix board is connected to a printed circuit board. The connections between the subject connection 10 and a circuit board is achieved via termination pins 34, 36. Termination pins 34 are straight and are mounted in apertures in the bottom cover plate which are adjacent the side walls. As discussed above, the termination pins are electrically connected to only one of the conductive bars. In the illustrated embodiment, straight termination pins 34 are connected to the lower array of conductive bars. In use, the downwardly extending straight termination pins 34 are connectable to a printed circuit board 60 which, as illustrated in FIG. 3, extends parallel to the bottom cover plate 24. The lower ends of pins 34 project through the printed circuit board 60 and may be soldered thereto. In accordance with the subject invention, to prevent solvents and solder from entering upwardly into the matrix board, a space S1 must be provided between the circuit board 60 and the bottom cover plate 24. Accordingly, downwardly projecting buttons 64 are provided on the bottom cover plate for creating the spacing therebetween. The space functions to prevent any liquid materials from traveling upwardly by capillary action into the matrix board which could result in shorting.

As discussed above, it is desirable to connect the subject matrix board to a pair of orthogonally disposed printed circuit boards. This object is achieved in the subject invention by providing a plurality of generally L-shaped termination pins 36. As illustrated in FIG. 1, each L-shaped termination pin 36 includes first and second leg portions 36A and 36B, respectively. Upstanding leg 36A is received in an opening 40 adjacent the periphery of the insulator block 20 and is connected to a single conductive bar. The second leg 36B projects outwardly from the connector perpendicular to and beyond the plane of the side wall. By this arrangement, and as illustrated in FIG. 3, the matrix connector can be affixed to a circuit board 60A disposed parallel to the side wall thereof.

As can be appreciated, when a printed circuit board is simultaneously mounted parallel to the bottom cover plate, shorting might occur between the lower board 60 and the termination pins 36. Therefore, in accordance with the subject invention, a means is provided for preventing any contact between the termination pins 36 and the circuit board 60. As more particularly illustrated in FIG. 2, the means includes providing a plurality of longitudinally extending grooves 66 in the bottom cover plate 24. Each groove 66 is associated with a termination opening in the bottom cover plate adjacent the side edge thereof. Each groove 66 is contiguous with the opening and extends to the side edge of the connector. The depth of the groove 66 substantially conforms to the diameter of the termination pins 36 such that the pins do not project below the plane of the bottom cover plate 24. The insertion of the pins 36 in the grooves prevents shorts from developing between the pins and the circuit board 60. Another advantage is that the groove walls stabilize the location of the pins and restricts their movement.

Preferably, the openings in the bottom cover plate 24 have a diameter sufficient to create a loose fit relationship with termination pins 34, 36. By this arrangement, a matrix board can be easily removed and replaced with another preprogrammed board. More specifically, the unwanted matrix board can be removed from both printed circuit boards by pulling in a direction illustrated by arrow A in FIG. 3. The termination pins 34, 36 will remain connected to the printed circuit boards. Thereafter, another matrix board having the desired programming is merely inserted downwardly over the remaining termination pins. The termination pins 34, 36 can be provided with a detent 58 similar to the ones formed on connecting pin 32, illustrated in FIG. 1.

As discussed above, in certain applications the subject connectors 10 are mounted in a side by side array. It would be desirable to provide a means for rapidly securing adjacent connectors to stabilize the array. Accordingly, the subject invention provides for an interengagement means which includes a locking recess 30 in combination with a longitudinally extending rail 70. As more particularly illustrated in FIG. 5, two connectors 10 are shown mounted in adjacent abutting relationship. Each connector 10 is provided with an identical, longitudinally extending recess which is generally rectangular in configuration having opposed side walls 72 and a rear wall 76. The rear wall 76 of recess 30 includes a dovetail slot 78.

Figure 5:
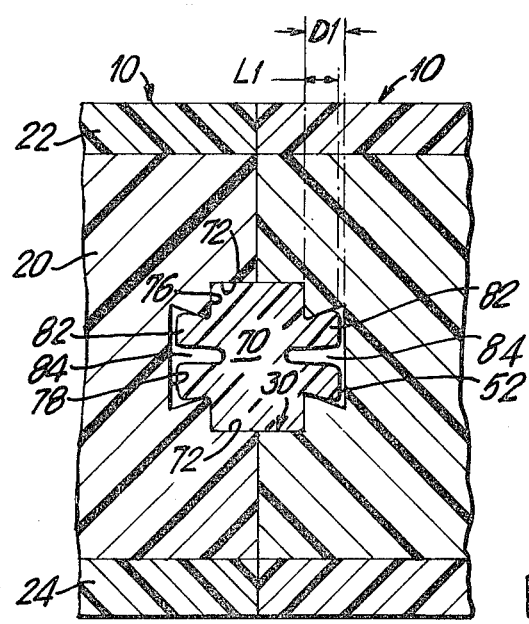
FIG. 5 is a partial, enlarged, cross-sectional view of the dovetail interconnection between adjacent programmable matrix boards of the subject invention.

The two adjacent connectors are held together by a longitudinally extending rail 70. Rail 70 is generally rectangular in configuration having dimensions corresponding to the combined dimensions of the opening defined by the pair of contiguous rectangular recesses 30 in the adjacent connectors 10. Rail 70 additionally includes a pair of opposed resilient locking tangs 82 which are receivable in the dovetail slots 78 of the locking recess 30. Tangs 82 have a complimentary dovetail configuration which includes a central groove 84. Groove 84 permits the prongs of the tang to flex inwardly enabling the tang 82 to be popped or snap fit into the dovetail slot 78 during assembly. The spring memory of the resilient material permits the tangs to resume its original shape (as illustrated in FIG. 5) providing a secure engaging means. Preferably, the length L1 of each tang is less than the depth D1 of the dovetail slot 78. This relationship functions to define a space 52 between the tangs and the rear surface of slot 78 which reduces friction therebetween. Accordingly, in use the rail 70 may be readily shifted within recess 30 to the desired position.

In summary, there is provided a new and improved means for interconnecting in matrix fashion a large number of conductor circuits. More specifically, a programmable matrix connector 10 is disclosed including a central insulator block 20 having an array of apertures 40 extending therethrough. A first series of conductive bars 46 are mounted within the apertures in a parallel array. A second series of conductive bars are mounted within the opposed lower side of the apertures in parallel array orthogonal to the upper parallel array. Each conductive bar comprises a plurality of sockets 48, receivable within the holes of the insulator block in a loose fit arrangement. Each socket includes a split or gap 52, as well as inwardly projecting dimples 54 to facilitate connection with a connector pin. A pair of upper and lower cover plates 22, 24 are provided which include ribs 56 on the inner surfaces thereof for aiding in the alignment of the conductive bars. Electrical connection can be established between a conductive bar in the first series with a conductive bar in the second series, by inserting a pin 32 in the hole of the insulator block through an aligned hole provided in one of the cover plates. The subject connector may be provided with generally L-shaped termination pins 36 for connection with a circuit board mounted parallel to the side walls of the connector 10. A plurality of grooves 66 are provided in the bottom cover plate 24 for receiving the L-shaped termination pins 36 such that the pins do not project below the planar surface of the bottom cover plate. The connecting pins may be provided with a detent area to increase the frictional interengagement with the sockets to inhibit the loss of electrical contact due to vibration.

Preferably, the subject invention also includes an improved means for interlocking adjacent, abutting matrix connectors. The locking means include a longitudinally extending rectangular recess 30 having a dovetail slot 78 defined in the rear wall of the recess. A longitudinally extending rectangular rail 70 is provided having a pair of opposed resilient dovetail tangs projecting therefrom. Each dovetail tang includes a groove 84 to enable the rails to be popped or snap fit into the locking recesses for easy assembly.

While the subject invention has been described in connection with a preferred embodiment, it should be understood that other modifications could be made therein by one skilled in the art without varying from the scope and spirit of the subject invention as defined by the appended claims.

What is claimed is:

1. A matrix connector for selectively connecting a cross bar in a first series of parallel bars with a similar cross bar in a second series of parallel bars comprising:

(a) an insulator block for supporting both series of parallel bars, formed with a plurality of spaced cylindrical apertures connecting two planar surfaces and arranged in two orthogonal lines;

(b) a first series of elongated conductive bars in parallel array, each bar in the first series including a strip of conductive material formed with alternate ridges and grooves along its longitudinal axis and including a plurality of depending cylindrical sockets having resilient clamping walls, said sockets positioned in one end of the cylindrical apertures in the insulator block;

(c) a second series of elongated conductive bars also in parallel array but perpendicular to the first series, each bar in the second series including a strip of conductive material formed with alternate ridges and grooves along its longitudinal axis and including a plurality of depending cylindrical sockets having resilient clamping walls, said sockets positioned in the other end of the cylindrical apertures in the insulator block;

(d) a first cover plate secured to one side of the insulator block for covering one series of cross bars, said cover plate formed with a plurality of apertures positioned in alignment with the apertures in the insulator block for the insertion of connecting pins;

(e) a second cover plate secured to the other side of the insulator block for covering the second series of cross bars, said second cover plate formed with a plurality of apertures positioned in alignment with the apertures in the insulator block for the insertion of connecting pins, said second cover plate further including termination holes, disposed adjacent the side edges thereof, said termination holes being aligned with apertures in said insulator block having only one socket of a single conductive bar therein, said termination holes for the insertion of termination pins, with the outer surface of said second cover plate further including a plurality of grooves, each groove being associated with a termination hole and being contiguous therewith, each said groove extending away from the associated termination hole to the side edge of said second cover plate;

(f) a plurality of conducting connecting pins for insertion through the apertures in either cover plate to make contact with a socket in the first series of bars and a socket in the second series of bars; and (g) a plurality of termination pins being generally L-shaped in configuration having first and second legs disposed in perpendicular relationship, with the diameter of said L-shaped termination pins substantially conforming to the depth of said grooves in said second cover plate wherein one leg of said L-shaped termination pin is receivable in a termination hole making electrical contact with one socket of a single conductive bar and with the other leg of said termination pin being receivable in the associated groove in such a manner to be flush with the planar outer surface of said second cover plate.

2. A matrix connector as recited in claim 1 wherein said other leg of said L-shaped connecting pin projects beyond the side edge of said second cover plate facilitating connection to a printed circuit board disposed perpendicular to said second cover plate.

3. A matrix connector as recited in claim 1 wherein said spaced cylindrical apertures in said insulator block are larger in diameter than said cylindrical sockets of said conductive bars such that a loose fit relationship is established facilitating alignment.

4. A matrix connector as recited in claim 1 wherein each of said sockets is formed with inwardly extending dimples for making positive contact with the connecting pins.

5. A matrix connector as recited in claim 4 wherein said connecting pins include at least one detent which cooperates with the dimples in said sockets to maintain the electrical connection therebetween when the connector is subject to vibration.

6. A matrix connector as recited in claim 1 wherein the insulated block is formed with a shallow recess bordered by a flange at each surface of the block containing the ends of said apertures, said recess for positioning the conductive bars therein.

7. A matrix connector as recited in claim 1 wherein said first and second cover plates are formed with ribs on their inside surfaces in alignment with the conductive bars for retaining the bars in position.

8. A matrix connector as recited in claim 1 wherein said insulator block includes a pair of opposed, longitudinally extending locking recesses along both sides thereof, each said locking recess for receiving a support rail to facilitate mounting of multiple connectors in an array, each said locking recess being generally rectangular in configuration and including a dovetail slot formed in the rear surface thereof, each said support rail being generally rectangular in configuration and including a pair of opposed complimentary resilient dovetail tangs, each said dovetail tang including a groove to permit the flexing of said tang to facilitate its insertion within said locking recess of said insulator block.

9. A matrix connector as recited in claim 8 wherein the distance which the tangs of said support rail project outwardly is less than the depth of said dovetail slot in said locking recess such that friction is reduced therebetween.

10. A matrix connector for selectively connecting a cross bar in a first series of parallel bars with a similar cross bar in a second series of parallel bars, said connectors being readily assembled into an abutting array, said connectors comprising:
(a) an insulator block for supporting both series of parallel bars, formed with a plurality of spaced cylindrical apertures connecting two planar surfaces and arranged in two orthogonal lines, said insulator block further including a pair of opposed, longitudinally extending locking recesses along both side edges thereof, each said locking recess being generally rectangular in configuration and including a dovetail slot formed in the rear surface thereof;
(b) a first series of elongated conductive bars in parallel array, each bar in the first series including a strip of conductive material formed with alternate ridges and grooves along its longitudinal axis and including a plurality of depending cylindrical sockets having resilient clamping walls, said sockets positioned in one end of the cylindrical apertures in the insulator block;
(c) a second series of elongated conductive bars also in parallel array but perpendicular to the first series, each bar in the second series including a strip of conductive material formed with alternate ridges and grooves along its longitudinal axis and including a plurality of depending cylindrical sockets having resilient clamping walls, said sockets positioned in the other end of the cylindrical apertures in the insulator block;
(d) a first cover plate secured to one side of the insulator block for covering one series of cross bars, said cover plate formed with a plurality of apertures positioned in alignment with the apertures in the insulator block for the insertion of connecting pins;
(e) a second cover plate secured to the other side of the insulator block for covering the second series of cross bars, said second cover plate formed with a plurality of apertures positioned in alignment with the apertures in the insulator block for the insertion of connecting pins, said second cover plate further including termination holes, disposed adjacent the side edges thereof, said termination holes being aligned with apertures in said insulator block having only one socket of of a single conductive bar therein, said termination holes for the insertion of termination pins, with the outer surface of said second cover plate further including a plurality of grooves, each groove being associated with a termination hole and being contiguous therewith, each said groove extending away from the associated termination hole to the side edge of said second cover plate;
(f) a plurality of conducting connecting pins for insertion through the apertures in either cover plate to make contact with a socket in the first series of bars and a socket in the second series of bars;
(g) a longitudinally extending support rail being receivable in said locking recess of said insulator block, said support rail being generally rectangular in configuration and including a pair of opposed, complimentary resilient dovetail tangs, each said dovetail tang including a groove to permit the flexing of said tang, whereby adjacent connectors can be assembled into an array by snap fitting one of said rails into the locking recesses of adjacent connectors; and
(h) a plurality of termination pins being generally L-shaped in configuration having first and second legs disposed in perpendicular relationship, with the diameter of each said L-shaped termination pin substantially conforming to the depth of said grooves in said second cover plate and being smaller than the termination holes in said second cover plate, whereby one leg of said L-shaped termination pin is loosely receivable in and easily removable from a termination hole in said second cover plate and making electrical contact with one socket of a single conductive bar, and with the other leg of said termination pin being receivable in the associated groove in such a manner to be flush with the planar outer surface of said second cover plate.

11. A matrix connector as recited in claim 10 wherein the distance which said tangs of said support rail project outwardly is less than the depth of said dovetail slot in said locking recess such that friction is reduced therebetween.

12. A matrix connector as recited in claim 10 wherein said other leg of said L-shaped connecting pin projects beyond the side edge of said second cover plate facilitating connection to a printed circuit board disposed perpendicular to said second cover plate.

13. A matrix connector as recited in claim 10 wherein each of said sockets is formed with inwardly extending dimples for making positive contact with the connecting pins.

14. A matrix connector as recited in claim 13 wherein said connecting pins include at least one detent which cooperates with the dimples in said sockets to maintain the electrical connection therebetween.

15. A matrix connector as recited in claim 10, wherein the cylindrical sockets of each said conductive bar in said first and second series of conductive bars are dimensioned to loosely fit within said cylindrical apertures of said insulator block thereby facilitating the alignment and placement of the connecting pins therein.

* * * * *